US008222578B2

(12) United States Patent
Beier

(10) Patent No.: US 8,222,578 B2
(45) Date of Patent: Jul. 17, 2012

(54) HOUSEHOLD APPLIANCE, ESPECIALLY COOKING APPARATUS, COMPRISING A DEVICE FOR MEASURING A PHYSICAL PARAMETER

(75) Inventor: Dominic Beier, Guetersloh (DE)

(73) Assignee: Miele & Cie. KG, Guetersloh (DE)

( * ) Notice: Subject to any disclaimer, the term of this patent is extended or adjusted under 35 U.S.C. 154(b) by 1257 days.

(21) Appl. No.: 11/910,842

(22) PCT Filed: Mar. 15, 2006

(86) PCT No.: PCT/EP2006/002360
§ 371 (c)(1),
(2), (4) Date: Oct. 5, 2007

(87) PCT Pub. No.: WO2006/111226
PCT Pub. Date: Oct. 26, 2006

(65) Prior Publication Data
US 2008/0210685 A1    Sep. 4, 2008

(30) Foreign Application Priority Data
Apr. 18, 2005  (DE) .......................... 10 2005 018 015

(51) Int. Cl.
*H05B 6/68* (2006.01)
*A01K 43/00* (2006.01)
(52) U.S. Cl. .................... 219/713; 219/516; 426/233

(58) Field of Classification Search ............... 219/713, 219/720, 736, 748, 725, 749, 516, 518, 712, 219/497; 426/233, 234, 523
See application file for complete search history.

(56) References Cited

U.S. PATENT DOCUMENTS

| 4,230,731 | A |   | 10/1980 | Tyler |
|---|---|---|---|---|
| 4,381,439 | A |   | 4/1983 | Miyazawa et al. |
| 4,475,024 | A |   | 10/1984 | Tateda et al. |
| 4,518,839 | A | * | 5/1985 | Taguchi et al. ............ 219/713 |
| 5,712,468 | A | * | 1/1998 | Ace ............................ 219/758 |
| 2003/0226842 | A1 | * | 12/2003 | Lee ............................. 219/757 |

FOREIGN PATENT DOCUMENTS

| EP | 0687866 | 12/1995 |
| JP | 56107139 | 11/1981 |
| KR | 2005021664 A * | 3/2005 |

* cited by examiner

*Primary Examiner* — Quang Van
(74) *Attorney, Agent, or Firm* — Leydig, Voit & Mayer, Ltd.

(57) ABSTRACT

A household appliance has a housing and a door that define an interior, and an electric controller. A measuring device is disposed in the interior for measuring a physical parameter and includes a measuring probe and a probe antenna. A lighting device for illuminating the interior of the household appliance includes a cover and a transmit or receive antenna. The transmit or receive antenna is disposed on the housing and sealed from the interior in a substantially airtight manner using the cover. The transmit or receive antenna is in signal communication with the electric controller allowing wireless signal transmission between the measuring probe and the electric controller.

20 Claims, 1 Drawing Sheet icity of manufacture and assembly is significantly reduced by structurally incorporating the transmit or receive antenna into the lighting device. Moreover, the above-mentioned system may be purchased as an assembly from a supplier.

The transmit or receive antenna can, in principle, be selected within wide suitable limits in terms of type, material, size and arrangement. Advantageously, the transmit or receive antenna extends substantially in a vertical direction with respect to the operating position of the household appliance.

In an embodiment of the present invention, with the household appliance in the operating position, the transmit or receive antenna is disposed in the area of an opening located in the interior wall and covered by the cover, and extends at least partially into the opening, which is bounded by the interior wall. This reduces the distance by which the transmit or receive antenna is spaced from the measuring probe disposed in the interior, and thus from the probe antenna.

In another embodiment, the transmit or receive antenna extends at least partially inside the cover. Accordingly, the distance between the transmit or receive antenna and the interior is further reduced. Moreover, the transmit or receive antenna is very well protected from environmental influences by being encapsulated in the cover. The transmit or receive antenna can extend entirely inside the cover, except for a terminal lug.

In an embodiment, the transmit or receive antenna extends at least partially along the edge of the cover or of the opening, with respect to the operating position of the household appliance. This ensures that the transmit or receive antenna does not affect the propagation of the light that is emitted into the interior by the lighting device. This also improves the visual appearance of the interior.

In yet another embodiment, the transmit or receive antenna has a loading coil. This allows the transmit or receive antenna, and thus also the lighting device, to be constructed in a space-efficient manner.

In another embodiment, the measuring device is designed such that the transmit or receive antenna can be used both as a transmit antenna and as a receive antenna. This allows signal transmission in both directions without increasing the number of antennas.

The cover can, in principle, be selected within wide suitable limits in terms of type, material, size and geometry. Advantageously, the cover is in the form of a glass cover. Glass is highly resistant to a variety of different chemical and physical environmental influences, in particular to elevated temperatures and contamination. In addition, it is easy to clean.

In a further embodiment of the teaching according to the present invention, the surface of the cover facing the interior is substantially flush with a surface of the housing facing the interior. In this manner, the cleaning and maintenance of the interior is further simplified, and the overall visual appearance is further improved. In addition, the useful interior volume is increased.

FIG. 1 shows a cooking appliance according to the present invention in the form of a baking oven. The baking oven has an interior 6 that is defined by a housing 2 and a door 4. FIG. 1 shows the backing oven with door 4 open, and looking at interior 6. Interior 6 is illuminated by two laterally disposed lighting devices 7. FIGS. 1 and 2 only show the lighting device that is located to the left in the plane of the drawing. Disposed in housing 2 is an electric controller which is in signal communication with a measuring device for measuring the temperature in interior 6, the electric controller being symbolized by a dashed line 8. Controls 9 and a display

HOUSEHOLD APPLIANCE, ESPECIALLY COOKING APPARATUS, COMPRISING A DEVICE FOR MEASURING A PHYSICAL PARAMETER

CROSS REFERENCE TO PRIOR RELATED APPLICATION

This is a U.S. National Phase application under 35 U.S.C. §371 of International Application No. PCT/EP2006/002360, filed Mar. 15, 2006 and claims the benefit of German Patent Application No. 10 2005 018 015.9, filed Apr. 18, 2005. The International Application was published in German on Oct. 26, 2006 as WO 2006/111226 under PCT Article 21(2).

FIELD OF THE INVENTION

The present invention relates to a household appliance including a measuring device for measuring a physical parameter.

BACKGROUND

European Patent EP 0 687 866 B1 describes a cooking appliance includes an interior that is defined by a housing and a door, an electric controller and a measuring device for measuring the temperature in a food load, said measuring device being provided with a probe antenna which is disposed on a measuring probe that takes the form of a cooking skewer and is located in the interior and further being provided with a receive antenna which is connected in signal communication with the electric controller, for wireless signal transmission between the measuring probe and the electric controller, said receive antenna being arranged on the housing and sealed from the interior in a substantially air-tight manner by means of a cover that is permeable to electromagnetic radiation.

SUMMARY

It is an aspect of the present invention to provide a household appliance which is less complex and less expensive to manufacture.

The present invention provides a household appliance a housing and a door that define an interior, and an electric controller. A measuring device is disposed in the interior for measuring a physical parameter and includes a measuring probe and a probe antenna. A lighting device for illuminating the interior of the household appliance includes a cover and a transmit or receive antenna. The transmit or receive antenna is disposed on the housing and sealed from the interior in a substantially airtight manner using the cover. The transmit or receive antenna is in signal communication with the electric controller allowing wireless signal transmission between the measuring probe and the electric controller.

BRIEF DESCRIPTION OF THE DRAWINGS

The invention will be explained further with respect to an exemplary embodiment shown in the drawings schematically, in which.

DETAILED DESCRIPTION

Figure 1:
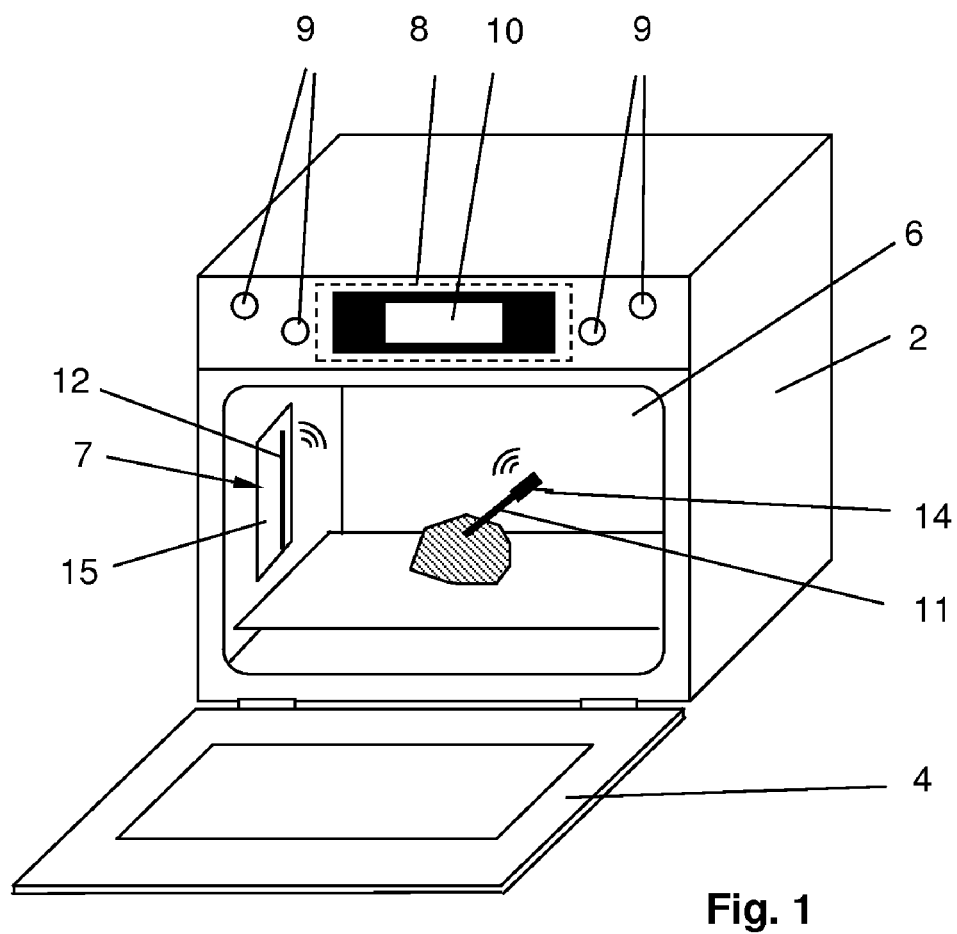
FIG. 1 is a perspective view of a household appliance according to the present invention.

An advantage offered by the present invention is the reduction in the complexity and cost of manufacture. The complexelement 10 are in signal communication with electric controller 8 in a manner known to those skilled in the art. For wireless signal transmission between a measuring probe 11 that takes the form of a cooking skewer and is located in interior 6, and electric controller 8, said electric controller is connected in signal communication with a transmit and receive antenna 12. Measuring probe 11 also has a probe antenna 14 for this purpose. Transmit and receive antenna 12 is disposed on housing 2 and sealed from interior 6 in a substantially air-tight manner by means of a cover 15 that is permeable to electromagnetic radiation, as will be explained in more detail with reference to FIG. 2.

Figure 2:
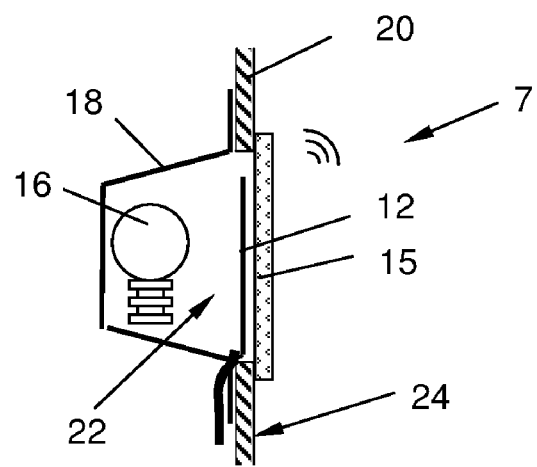
FIG. 2 is a cross-sectional view showing a detail of the household appliance of FIG. 1 in the region of the lighting device.

FIG. 2 is a detail view showing the lighting device 7 that is located to the left in the plane of FIG. 1. The lighting device 7 shown here includes a light source 16, a light housing 18, and the transmit and receive antenna 12 mounted on light housing 18, and is disposed on interior wall 20 behind an opening 22 of interior wall 20 in a manner known to those skilled in the art. Lighting device 7 is sealed off from interior 6 in a substantially air-tight manner by means of a cover 15 that takes the form of a transparent glass cover and is permeable to electromagnetic radiation. The inner wall of light housing 18 is designed as a reflector in a manner known to those skilled in the art. In the present exemplary embodiment, transmit and receive antenna 12 extends substantially in a vertical direction with respect to the operating position of the household appliance, which position is shown in FIG. 1; the transmit and receive antenna 12, for the most part, extending within opening 22, which is bounded by interior wall 20. Only a fastening portion of transmit and receive antenna 12 extends over the edge of opening 22 and is suitably affixed to light housing 18 in a manner known to those skilled in the art. Thus, transmit and receive antenna 12 can be electrically connected in a particularly easy manner.

The operating principle of the household appliance, and measuring device, is known to those skilled in the art and therefore does not need further explanation.

Alternatively, it would also be possible for transmit and receive antenna 12 to extend at least partially along the edge of cover 15 or of opening 22, with respect to the operating position of the baking oven. In cases where space is limited, such as with small lighting devices and, thus, with small light housings 18, transmit and receive antenna 12 can be configured, at least in part, as a loading coil.

Unlike the present exemplary embodiment, where cover 15 is disposed on the inner side of interior wall 20, it is also conceivable for cover 15 to be substantially integrated into interior wall 20, so that the surface of cover 15 facing the interior 6 is substantially flush with surface 24 of interior wall 20, and thus of housing 2, which surface 24 faces the interior 6.

The present invention is not limited to the exemplary embodiment described above. In particular, cover 15 may be made of other suitable materials known to those skilled in the art. Further, the transmit and receive antenna can, in principle, be selected within wide suitable limits in terms of type, material, size and geometry. For example, in place of a single transmit and receive antenna 12, it would also be possible to provide two separate antennas, namely one transmit antenna and one receive antenna, in a light housing 18 or in two different light housings 18.

What is claimed is:

1. A household appliance comprising:
   an interior defined by a housing and a door;
   an electric controller;
   a measuring device disposed in the interior for measuring a physical parameter, the measuring device comprising a measuring probe and a probe antenna;
   a lighting device operable to illuminate the interior, the lighting device including a cover and a transmit or receive antenna disposed on the housing and sealed from the interior in a substantially airtight manner using the cover, the cover permeable to electromagnetic radiation, the transmit or receive antenna being in signal communication with the electric controller for wireless signal transmission between the measuring probe and the electric controller.

2. The household appliance as recited in claim 1 wherein the transmit or receive antenna extends substantially vertically relative to an operating position of the household appliance.

3. The household appliance as recited in claim 2 wherein the transmit or receive antenna comprises a loading coil.

4. The household appliance as recited in claim 2 wherein the cover comprises glass.

5. The household appliance as recited in claim 2 wherein a surface of the cover facing the interior is substantially flush with a surface of the housing facing the interior.

6. The household appliance as recited in claim 1 wherein the transmit or receive antenna extends at least partially into an opening bounded by the interior and covered by the cover.

7. The household appliance as recited in claim 6 wherein the transmit or receive antenna comprises a loading coil.

8. The household appliance as recited in claim 6 wherein the cover comprises glass.

9. The household appliance as recited in claim 1 wherein the transmit or receive antenna at least partially extends inside the cover.

10. The household appliance as recited in claim 9 wherein the transmit or receive antenna comprises a loading coil.

11. The household appliance as recited in claim 1 wherein the transmit or receive antenna at least partially extends along one of an edge of the cover and the opening.

12. The household appliance as recited in claim 11 wherein the transmit or receive antenna comprises a loading coil.

13. The household appliance as recited in claim 1 wherein the transmit or receive antenna comprises a loading coil.

14. The household appliance as recited in claim 13 wherein the cover comprises glass.

15. The household appliance as recited in claim 13 wherein a surface of the cover facing the interior is substantially flush with a surface of the housing facing the interior.

16. The household appliance as recited in claim 13 wherein the physical parameter includes a temperature.

17. The household appliance as recited in claim 1 wherein the transmit or receive antenna is operable as a transmit antenna and as a receive antenna.

18. The household appliance as recited in claim 1 wherein the cover comprises glass.

19. The household appliance as recited in claim 1 wherein a surface of the cover facing the interior is substantially flush with a surface of the housing facing the interior.

20. The household appliance as recited in claim 1 wherein the physical parameter includes a temperature.

* * * * *